United States Patent [19]

Ivannikov

[11] Patent Number: 4,902,873
[45] Date of Patent: Feb. 20, 1990

[54] METHOD OF ELECTRIC ARC WELDING

[76] Inventor: Alfred V. Ivannikov, Ostrov, 4 linia, 45, kv. IO, Leningrad, Vasilievsky, U.S.S.R.

[21] Appl. No.: 153,271

[22] PCT Filed: Feb. 20, 1986

[86] PCT No.: PCT/SU86/00015
§ 371 Date: Oct. 19, 1987
§ 102(e) Date: Oct. 19, 1987

[87] PCT Pub. No.: WO87/04956
PCT Pub. Date: Aug. 27, 1987

[30] Foreign Application Priority Data

Dec. 25, 1978 [SU] U.S.S.R. .............................. 2731253

[51] Int. Cl.$^4$ ........................ B23K 9/28; B23K 9/00; B23K 9/12
[52] U.S. Cl. ............................. 249/137 R; 219/137.2; 219/137.7
[58] Field of Search ............... 219/136, 137.2, 137.7, 219/137 R

[56] References Cited

U.S. PATENT DOCUMENTS 2,527,336 10/1950 Schaefer ........................... 219/137.7
2,868,956 1/1959 Lobosco ........................... 219/137.7
4,013,868 3/1977 Koshiga et al. ............ 219/137 WM

FOREIGN PATENT DOCUMENTS 52-143943 11/1977 Japan .
55-22460 2/1980 Japan .
504612 5/1976 U.S.S.R. .
1517812 7/1978 United Kingdom .
1579607 11/1980 United Kingdom .

OTHER PUBLICATIONS

"Techniques of Electric Fusion Welding of Metals and Alloys", edited by B. Ye. Paton, 1974, pp. 207–211, Moscow.
"Gas Shielded Metal-Arc Welding", by A. G. Potapyevsky, 1974, (Moscow), p. 142.

Primary Examiner—Teresa J. Walberg
Assistant Examiner—Scott A. Rogers
Attorney, Agent, or Firm—Lilling and Greenspan

[57] ABSTRACT

A method of elctric-arc welding includes the steps of feeding of a main metal-arc electrode (4) into a welding zone (1), the electrode being composed of at least one filler wire, and an additional metal-arc electrode (5) made up of at least one filler wire (6, 7, 8) and being under the same potential as the main metal-arc electrode (4). Control of the welding current, size and shape of the weld seam is carried out by virtue of a total cross-sectional area of the additional metal-arc electrode (5). Then the crater at the end of a weld seam (13) is filled up by consecutively disengaging the feed traverse of the filler wires of the main and additional metal-arc electrodes (4, 5).

2 Claims, 1 Drawing Sheet

METHOD OF ELECTRIC ARC WELDING

BACKGROUND OF THE INVENTION

1. Field of the Invention

The present invention generally relates to electric welding and more specifically to methods of electric-arc welding.

2. Description of Related Art

A method of consumable-electrode electric arc welding is in wirespread use nowadays, wherein a consumable electrode is fed into the welding zone, said electrode being in fact a round-section solid wire (of., e.g. 'Techniques of electric fusion welding of metals and alloys', edited by B. Ye. Paton, 1974, (Moscow) pp. 207–211, FIG. 5–50; p. 475, FIG. 9–6, Table 9—9; "Gas-shielded metal-arc welding" by A. G. Potapyevsky, 1974 (Moscow), p. 142, FIG. 55; p. 127, FIG. 49 (in Russian). Used as a shielding medium are a variety of fluxes or gases. Control of the welding current (amperage), size and shape a weld seam, and efficiency of the welding process is effected by varying the rate of feed of a metal-arc electrode into the welding zone, and by changing the welding voltage.

Filling-up of the weld end crater is carried out by appropriately varying the rate of feed of the metal-arc electrode and the value of the welding voltage.

According to the aforementioned electric-arc welding method a preset depth of penetration of the metal being welded is easily attainable due to a broad range of feed rates of a single cross-section metal-arc electrode. However, whenever it becomes necessary to increase the welding current (amperage), efficiency of the welding process and weld seam dimensions (e.g., for welding extra-thick metallic components without bevelled edge in the components being welded together and with a gapless joint therebetween), one must increase the rate of feed of the metal-arc electrode into the welding zone and the welding voltage value. This in turn involves excessive consumption of the welding materials and electric power, an oversize weld and impaired shape and quality of a welded joint of the components being welded together.

Moreover, necessity for a synchronous control of the welding amperage and welding voltage results sophistication of the welding equipment and affects its operating reliability. Filling-up of an end crater of the weld seam also involves complicated equipment, since the filling-up procedure is carried out by simultaneous control of the metal-arc electrode feed rate and of the welding voltage, which deteriorates the quality of the weld seam obtained.

Known in the present state of the welding art is a widely used method of electric-arc welding, wherein a metal-arc electrode fed into the welding zone is composed of two or more bare wires arranged parallel to one another and connected to the same source of welding current (cf., e.g., British Pat. No. 1,280,147, Int.Cl. B3R). All the wires that the electrode is made up of are fed into the welding zone at the same time.

Control of the welding amperage and efficiency of the welding process, and of the size and shape of the weld seam is carried out by varying the rate of feed of a metal-arc electrode into the welding zone and by changing the welding voltage.

According to the electric-arc welding method discussed above a preset depth of penetration of the metal being welded is easily attainable, since preset welding amperage and depth of penetration of the metal being welded correspond to each rate of feed of the metal-arc electrode, while the depth of penetration varies, in this particular case, in direct proportion to the welding amperage or current density effective in the metal-arc electrode. The electric-arc welding method under consideration suffers from a serious disadvantage, that is, the melting rate of the metal-arc electrode changes more intensity than the depth of penetration of the metal being welded, which is evident from the following formula:

$$Q = I^2 \cdot R \cdot t,$$

where

Q - amount of heat evolved by the metal-arc electrode extension;

I - welding amperage;

R - resistance of the electrode extension;

t - time of welding current passing through the metal-arc electrode extension.

This results in too high consumption of the welding materials and electric power and makes it impossible to obtain a weld seam featuring satisfactory dimensions and shape of weld beads within a broad range of weld joint thickness of the components being welded, by virtue of electric-arc welding with a composite metal-arc electrode. Thus, for instance, whenever it is necessary to weld heavy metallic components together using electric-arc welding without bevelling the edges being welded, one must increase the welding amperage, the rate of feed of the composite metal-arc electrode, and the welding voltage.

Since the metal-arc electrode melts more intensely than the metal of the components being welded together, the resultant weld seam features oversized weld bead, unsatisfactory cross-sectional shape, and low quality. This disadvantage of the method is counteracted by prebevelling the edges being welded, which adds mush to the labour requirements for production of an article or structure, and affects the efficiency of the welding process. Filling-up of the weld and crater is carried out by stretching the arc followed by its extinction. The present electric-arc welding method makes no provision for welding variable-size joint edges since, e.g., an increased gap in the butt joint being welded involves higher demand for the metal of a metal-arc electrode, which can be met due to an increased rate of feed of the composite metal-arc electrode. This results in high welding amperage and hence in a proportionally increased arc current density, which is fraught with possible burn-through of the components being welded together.

The method suffers from a disadvantage concerned with a necessity for a synchronous control of the welding amperage and welding voltage, which increases the sophistication of much the welding equipment. Besides, filling-up the weld end crater by stretching the arc adversely affects the quality of the weld seam obtained.

SUMMARY OF THE INVENTION

It is a primary and essential object of the present invention to provide a method of electric-arc welding featuring such metal-arc electrode operating modes that would make it possible to increase the efficiency and quality of the electric-arc welding process.

The object is accomplished due to the fact that in a method of electric-arc welding, incorporating the feeding of a main metal-arc electrode composed of at least one filler wire, into the welding zone, control of the welding amperage, size and shape of the weld seam, and filling-up of the welded crater. According to the invention, there is fed into the welding zone an additional metal-arc electrode composed of at least one filler wire, said additional electrode being under the same potential with the main metal-arc electrode, control of the welding amperage, size and shape of the weld seam is effected by virtue of a total cross-sectional area of the additional metal-arc electrode, and the welding voltage value is maintained constant, while the weld end crater is filled up by consecutively disengaging the feed traverse of the main and additional metal-arc electrodes.

It is expedient that, with a view to increasing the quality of the electric-arc welding process, the cross-sectional area of each of the filler wires of the additional metal-arc electrode be equal to or less than the cross-sectional area of the main metal-arc electrode.

Implimentation of the proposed method of electric-arc welding is instrumental in increasing the efficiency and quality of the electric-arc welding process, reduce the consumption of the welding materials and electric power, and utilize simpler welding equipment.

BRIEF DESCRIPTION OF THE DRAWINGS

In what follows the present invention will be disclosed in a detailed description of a method of electric-arc welding with reference to the accompanying drawings, wherein.

DESCRIPTION OF THE PREFERRED EMBODIMENT

Figure 1:
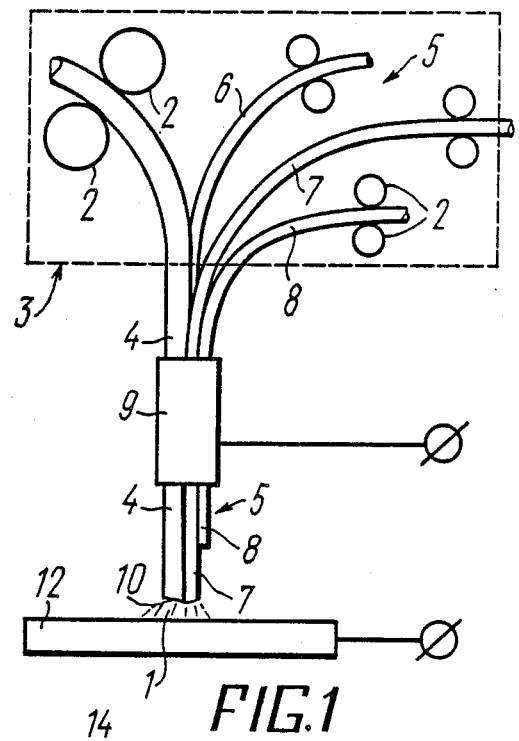
FIG. 1 is a side view of a diagram for carrying into effect the method of electric-arc welding, according to the invention.

The method of electric-arc welding proposed in the invention consists in the following.

Before starting the electric-arc welding, process a main metal-arc electrode 4 is fed into a welding zone 1 with the aid of roller 2 of a feed mechanism 3. The electrode 4 is composed of a single filler wire.

The main metal-arc electrode 4 may be made up of a few filler wires.

Next an additional metal-arc electrode 5 made up of filler wires 6, 7, 8, is fed into the welding zone 1.

The main metal-arc electrode 4 and the additional metal-arc electrode 5 are passed through a current supply device 9, whereby both of the electrodes are under the same potential.

An end 10 of the main metal-arc electrode 4, irrespective of its design and shape, is arranged symmetrically above a welding line 11 (FIG. 2) of a component 12 being welded.

The number of the filler wires 6, 7, 8 (FIG. 1) of the additional metal-arc electrode 5 and the total cross-sectional area of the wires 6, 7, 8 depend on the technological task and welding amperage values within which its control is carried out.

Then an arc is initiated and the electric-arc welding process is started to form a weld seam 13 (FIG. 2) on the component 12 being welded. For a better arc striking, electric-arc welding begins with contacting the surface of the component 12 being welded by one of the filler wires of the main metal-arc electrode 4 (FIG. 1), or by that of the additional metal-arc electrode 5, preferably by the wire having the smallest crosssectional area. The electric-arc welding process terminates with filling-up of a crater 14 (FIG. 2) at the end of the weld seam 13. Depending on the electric-arc welding on the electric-arc welding conditions, the cross-sectional area of the main metal-arc electrode 4 (FIG. 1) and of the additional metal-arc electrode 5, as well as on the technologic task, the crater 14 (FIG. 2) at the end of the weld seam 13 is filled up by disengaging the feed traverse of the main metal-arc electrode 4 (FIG. 1) and that of the additional metal-arc electrode 5 in such a sequence that provides for a required rate of the welding amperage decrease. As a consequence, the resultant weld seam 13 (FIG. 2) features the completely filled-up crater 14 at its end.

When adjusting the welding unit for electric-arc welding of metallic components within a broad range of thicknesses, use is made of the number of filler wires of the main and additional metal-arc electrodes 4 and 5, (FIG. 1) respectively, whose total cross-sectional area provides for the maximum welding amperage required for electric-arc welding of the heaviest metallic components.

The least thickness of the metallic components being welded is assumed as the basic value, and a required cross-sectional area of the main metal-arc electrode 4 is established depending on the welding amperage required for welding the metallic components of a given thickness. The main metal-arc electrode 4 is composed of a single or severall filler wires depending on the wire diameter.

A total cross-sectional area of the filler wires of the main metal-arc electrode 4 remains unaffected in the course of welding metallic components which thickness exceeds the basic value, while a total cross-sectional area of the additional metal-arc electrode 5 is increased depending on the welding amperage required for welding the components 12 having a larger thickness.

When it is necessary to weld the metallic component 12 featuring wide variations of the gap in the joint 11 of the components 12 (FIG. 2) being welded, or wide variations in the joint angle of the edges (in the case of the component 12 having bevelled edges (omitted in the drawing), the welding unit is adjusted in the manner described above. Before starting the welding of such a joint of the components 21 being welded together, one should evaluate the degree of variation of the gap in the joint 11 of the components 12, and pass the number the filler wires through the current supply device 9 (FIG. 1) for the main and additional metal-arc electrodes 4, 5 whose total cross-sectional are provides for normal filling of the zone of welding joint of the components 12 featuring the maximum gap in the joint 11 (FIG. 2), so as to obtain the full-sized weld seam 13.

When the gap in the joint of the component 12 is within the tolerance limits in the initial portion of the joint 11, the main metal-arc electrode 1 (FIG. 1) alone is fed into the welding zone 1 (FIG. 1), the cross-sectional area of which provides for a required welding amperage. Further on, as the gap in the joint 11 (FIG. 2) is increased in the course of the welding process and hence the demand for the electrode filling metal is required, the cross-sectional area of the additional metal-arc electrode 5 (FIG. 1) is increased due to an increased number of the filler wires of the additional metal-arc electrode 5.

Figure 2:
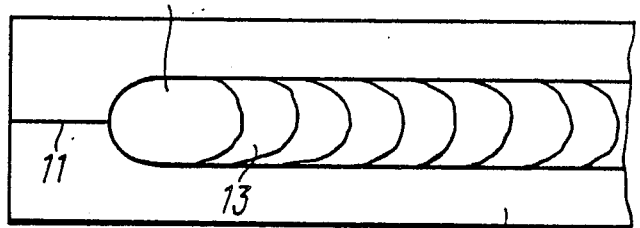
FIG. 2 is a plan view of the components being welded together, according to the invention.

Rise of the welding amperage in the course of the welding process does not increase the penetrability of the welding arc and is aimed largely at melting the metal of the main and additional electrodes 4, 5, since current density in the welding arc is not increased with an increased cross-sectional area of the additional melt-arc electrode 5 during the welding process, and is sometimes even decreased. That is why such a common welding fault as burn-through of the component 12 is completely ruled out at the places of welding joint of the component 12 featuring the maximum gap in the joint 11 (FIG. 2).

As the gap in the joint 11 decreases the total cross-sectional area of the additional metal-arc electrode 5 (FIG. 1) is decreased correspondingly due to a reduced number of the filler wires 6, 7, 8 engaged in the electric-arc welding process.

To attain regular and smooth deposition of an additional filler metal on the weld seam 13 (FIG. 2) due to feeding the filler wires 6, 7, 8 of the additional metal-arc electrode 5 (FIG. 1) without wide variations of the welding amperage and disturbing the stability of the welding process, the cross-sectional area of each of the filler wires of the additional metal-arc electrode 5 should be as small as possible so as not to exceed the cross-sectional area of the filler wire of the main metal-arc electrode 4.

Feed of the filler wires for the main metal-arc electrode 4 and the additional metal-arc electrode 5 may be effected by means of feed mechanisms having either a common or individual drive.

The filler wires used for the main and additional electrodes 4, 5 may be round or nonround. Filler wires having different-sectional shape and construction may be engaged in the welding process as the wires for the main and additional electrodes 4, 5.

EXAMPLE 1

Double-butt joints of low-alloyed steel components 6, 12, 8 and 4 mm thick are welded under flux shield, prepared without edge bevelling and with a gapless joint.

For the welding conditions, parameters of the electrodes 4, 5 and sizes of the resultant weld seam beads refer to Table 1 below.

Once the weld joints have been obtained on one side of the components, the latter are turned over, and the welded joints are obtained on the other side.

As a result, the butt joints within the entire range of thicknesses from 16 to 4 mm are welded with high-quality weld seams featuring favourable weld seam bead form factor (i.e., the ratio of the weld width to the height of its reinforcement (convexity) in all the weld seams obtained, which is indicative of a very reasonable consumption of the metal-arc electrode and of electric power (see Table 1). The weld seams feature neither surface nor subsurface flaws.

EXAMPLE 2

A butt-joint of a low-carbon steel component 14 mm thick is welded with a V-grooved edges and a back weld formation on a coper-flux backup, the length of joint being 1000 mm.

The joint is so assembled for welding that the prepared cross-sectional area increases from the beginning to the end by 30 percent.

The welding process initiates from striking the arc by contacting the component being welded by one of the filler wires of the additional metal-arc electrode (in order to facilitate arc striking). Then the main metal-arc electrode starts to be fed, and the welding arc begins traversing along the joint. Every 250 mm of the joint length the filler wires of the additional metal-arc electrode start to be fed (only by one) so that all all the four wires are engaged in the welding process on the last joint section (that is, the main metal-arc electrode and the three wires of the additional metal-arc electrode).

Welding conditions:

| Welding conditions: | |
|---|---|
| Diameter of main metal-arc electrode, mm | 5 |
| Diameter of additional metal-arc electrode filler wires, mm | 1.6 |
| Welding amperage of main metal-arc electrode, A | 900 |
| Welding amperage of main electrode plus one filling wire of additional electrode | 1000 |
| Welding amperage of main electrode plus two filling wires of additional electrode | 1100 |
| Welding amperage of main electrode plus three filling wires of additional electrode | 1200 |
| Arc voltage, V | 40 |
| Welding speed, m/h | 25 |

The resultant weld seam is filled uniformly throughout its entire length and features the standard reinforcement as to shape and size free from surface or subsurface flaws.

Used as the sources of welding current in the Examples stated above are two serially manufactured welding rectifiers connected in parallel.

Practical application of the present invention makes it possible to dispense with a commonly employed but loweccifient method of welding amperage control, as well as of control of the weld seam size and efficiency of the welding process due to adjustment of the electrode feed rate and the welding voltage, to control these parameters operatively with the welding voltage remaining unaffected, and to reduce consumption of the welding materials and electric power three times and over (depending on the type of edge preparation of the component being welded).

The proposed method of electric-welding provides for a simpler and more reliable filling-up of the weld crater and ensures high-quality weld seam which is of paramount importance in welding of components and structures with annular weld seams of closed weld seams of another type.

The method of electric-arc welding makes it possible to simplify the welding process control procedure and render it more reliable.

Possibility of utilizing a metal-arc electrode with a a higher total cross-sectional area enables very low voltage values and increased welding speeds to be applied. In its turn application of low welding voltage values (down to 36V at any welding amperage) and no necessity of their adjustment in welding of metal of any thickness makes it practicable to use the sources of welding current simpler in construction and 1.5 to 2 times less material-consuming as compared with those in current use. In addition, the method is successfully applicable at higher welding voltages with the arc fed from conventionally employed sources of welding current.

The invention can find application for electric-arc welding if metallic components and structures under flux-shield, shielding gases, or mixtures thereof, using solid or powder wires, as well as with the use of special fluxless wires without gas shields, in chemical and power-engineering industries, in shipbuilding and heavy mechanical engineering industry.

TABLE 1

| Nos | Metal thickness, mm | Diameter of main metal-arc electrode, mm | Diameter of filler wires of additional metal-arc electrode, mm | Number of filler wires in additional metal-arc electrode |
|---|---|---|---|---|
| 1 | 16 | 4 | 4 | 3 |
| 2 | 12 | 4 | 4 | 2 |
| 3 | 8 | 4 | 4 | 1 |
| 4 | 4 | 4 | — | — |

| Nos | Welding amperage, A | Arc voltage, V | Welding speed, m/h | Weld seam bead dimensions, mm width | height |
|---|---|---|---|---|---|
| 1 | 2600 | 33 | 100 | 23 | 2.5 |
| 2 | 2000 | 33 | 100 | 20 | 2.2 |
| 3 | 1400 | 33 | 100 | 16 | 2.0 |

TABLE 1-continued

| 4 | 800 | 33 | 100 | 10 | 1.6 |
|---|---|---|---|---|---|

What is claimed is:

1. A method of electric arc welding, comprising the steps of feeding a main consumable electrode (4) consisting of at least one wire through a current supply device (9) into a welding zone (1), feeding an additional consumable electrode (5) of at least one filler wire (6,7,8) in sliding contact with the main consumable electrode (4) and the current supply device (9) into the welding zone (1) through the current supply device (9); filling a crater along a welding line with a weld seam; controlling the welding amperage, and the size and shape of the weld seam by varying the total cross-sectional area of the consumable electrodes (4,5) by feeding a variable number of wires comprising said main and said additional consumable electrodes (4,5).

2. A method of electric-arc welding as claimed in claim 1, characterized in that the cross-sectional area of each of the filler wires (6, 7, 8) of the additional metal-arc electrode is equal to or less than the cross-sectional area of the main metal-arc electrode (4).

* * * * *